(12) United States Patent
Yasuo et al.

(10) Patent No.: US 10,718,540 B2
(45) Date of Patent: Jul. 21, 2020

(54) THERMAL STORAGE AIR CONDITIONER

(71) Applicant: DAIKIN INDUSTRIES, LTD., Osaka-shi, Osaka (JP)

(72) Inventors: Kouichi Yasuo, Osaka (JP); Shuuji Fujimoto, Osaka (JP); Kebi Chen, Osaka (JP); Takuya Nakao, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/529,616

(22) PCT Filed: Dec. 2, 2015

(86) PCT No.: PCT/JP2015/005982
§ 371 (c)(1),
(2) Date: May 25, 2017

(87) PCT Pub. No.: WO2016/103584
PCT Pub. Date: Jun. 30, 2016

(65) Prior Publication Data
US 2017/0261242 A1    Sep. 14, 2017

(30) Foreign Application Priority Data
Dec. 26, 2014  (JP) .................................. 2014-265721

(51) Int. Cl.
*F24F 11/46* (2018.01)
*F24F 11/89* (2018.01)
(Continued)

(52) U.S. Cl.
CPC ............ *F24F 11/46* (2018.01); *F24F 5/0017* (2013.01); *F24F 11/30* (2018.01); *F24F 11/65* (2018.01);
(Continued)

(58) Field of Classification Search
CPC .. F25B 25/005; F25B 2313/009; F25D 16/00; F25D 2020/0082; F24F 2005/0025; F24F 11/46
See application file for complete search history.

(56) References Cited

U.S. PATENT DOCUMENTS 4,100,763 A * 7/1978 Brody ................. F24D 11/0285
                                                                62/238.6
4,735,064 A * 4/1988 Fischer ................... F25D 16/00
                                                                62/307
(Continued)

FOREIGN PATENT DOCUMENTS

CN        2802328 Y    8/2006
JP        7-190534 A   7/1995
(Continued)

OTHER PUBLICATIONS

International Search Report, issued in PCT/JP2015/005982, dated Mar. 8, 2016.
(Continued)

*Primary Examiner* — Keith M Raymond
(74) *Attorney, Agent, or Firm* — Birch, Stewart, Kolasch & Birch, LLP

(57) ABSTRACT

The control section implements: a utilization cooling operation in which the thermal storage medium absorbs heat from the refrigerant and in which the refrigerant evaporates in the indoor heat exchanger, when the receiving section receives a first signal indicating a request for reduced use of power during an operation in which the room is cooled by the refrigerant evaporating in the indoor heat exchanger; and a cooling and cold thermal energy storage operation in which the refrigerant absorbs heat from the thermal storage medium and in which the refrigerant evaporates in the indoor heat exchanger, when the receiving section receives a second signal indicating a request for accelerated use of
(Continued)

power during the operation in which the room is cooled by the refrigerant evaporating in the indoor heat exchanger.

16 Claims, 8 Drawing Sheets

(51) Int. Cl.
    F25B 13/00    (2006.01)
    F25B 5/00     (2006.01)
    F24F 11/65    (2018.01)
    F25B 49/02    (2006.01)
    F24F 11/30    (2018.01)
    F25B 7/00     (2006.01)
    F24F 5/00     (2006.01)
    F25B 25/00    (2006.01)

(52) U.S. Cl.
     CPC ............... *F24F 11/89* (2018.01); *F25B 5/00* (2013.01); *F25B 7/00* (2013.01); *F25B 13/00* (2013.01); *F25B 25/005* (2013.01); *F25B 49/02* (2013.01); *F24F 2005/0025* (2013.01); *F25B 2313/009* (2013.01); *F25B 2600/13* (2013.01); *Y02B 30/745* (2013.01)

(56) References Cited

U.S. PATENT DOCUMENTS

| | | | | |
|---|---|---|---|---|
| 4,964,279 A | * | 10/1990 | Osborne | F25D 16/00 62/201 |
| 5,095,715 A | * | 3/1992 | Dudley | F25B 49/02 62/228.4 |
| 5,211,029 A | * | 5/1993 | Uselton | F24F 5/0017 62/324.5 |
| 5,239,838 A | * | 8/1993 | Tressler | F24D 11/0221 237/2 B |
| 5,307,642 A | * | 5/1994 | Dean | F24F 5/0017 62/201 |
| 5,467,812 A | * | 11/1995 | Dean | F24F 5/0017 165/62 |
| 5,678,626 A | * | 10/1997 | Gilles | F24F 5/0017 165/62 |
| 8,511,109 B2 | * | 8/2013 | Kuehl | F25D 16/00 62/434 |
| 8,516,847 B2 | * | 8/2013 | Koh | F24F 5/0017 62/182 |
| 9,897,364 B2 | * | 2/2018 | Kuehl | F25D 11/022 |
| 2005/0194456 A1 | * | 9/2005 | Tessier | F24F 11/30 236/51 |
| 2011/0100611 A1 | * | 5/2011 | Ohler | F01K 3/00 165/104.28 |
| 2016/0238308 A1 | * | 8/2016 | Uchida | F25D 17/065 |

FOREIGN PATENT DOCUMENTS

| | | |
|---|---|---|
| JP | 9-189444 A | 7/1997 |
| JP | 4407582 B2 | 2/2010 |
| JP | 2014-115009 A | 6/2014 |
| JP | 2014-129902 A | 7/2014 |
| JP | 2014-129973 A | 7/2014 |

OTHER PUBLICATIONS

Extended European Search Report dated May 4, 2018 in corresponding European Application No. 15872161.3.

* cited by examiner

FIG.4 COLD THERMAL ENERGY STORAGE OPERATION

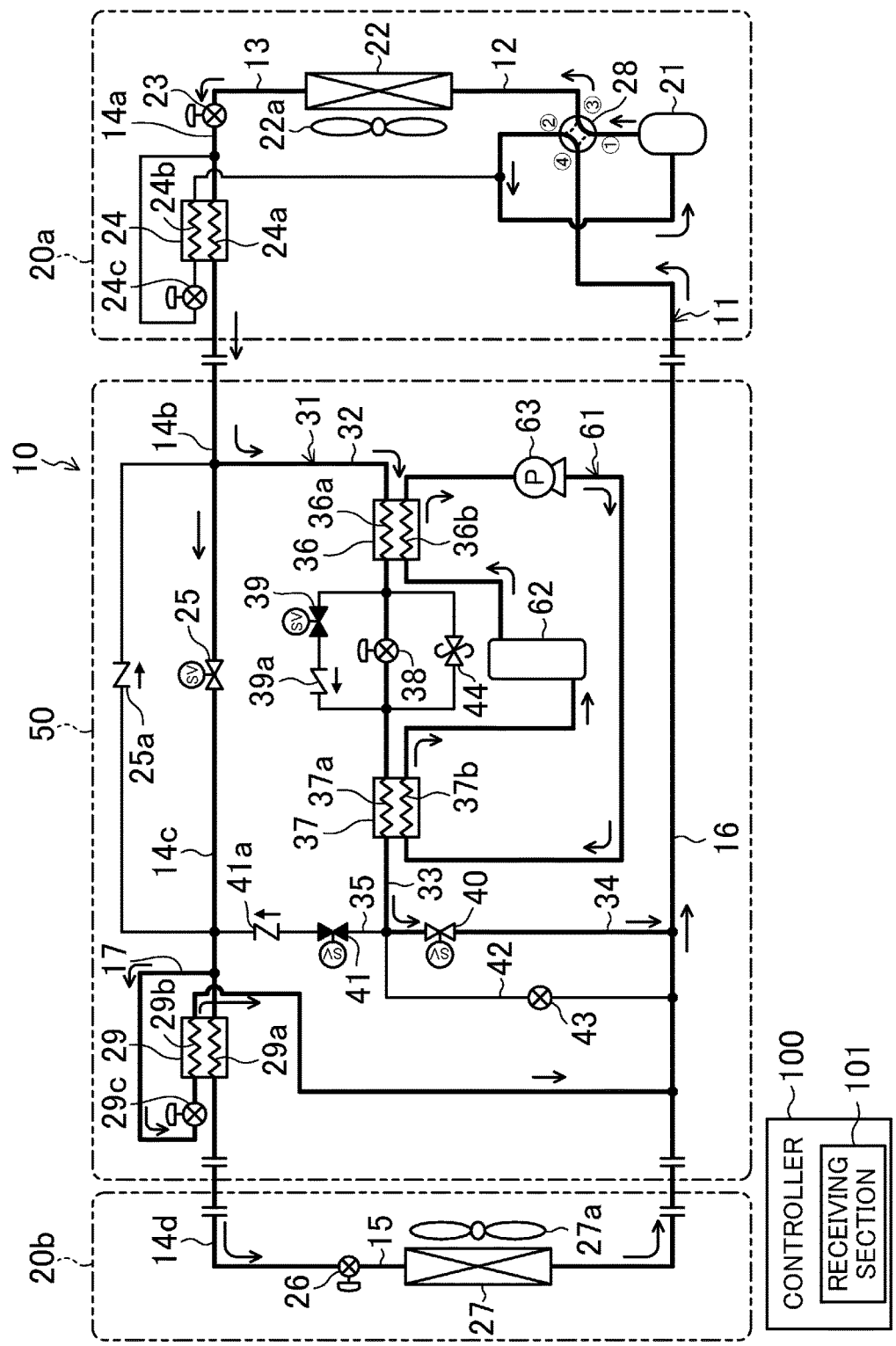
FIG.6 COOLING AND COLD THERMAL ENERGY STORAGE OPERATION

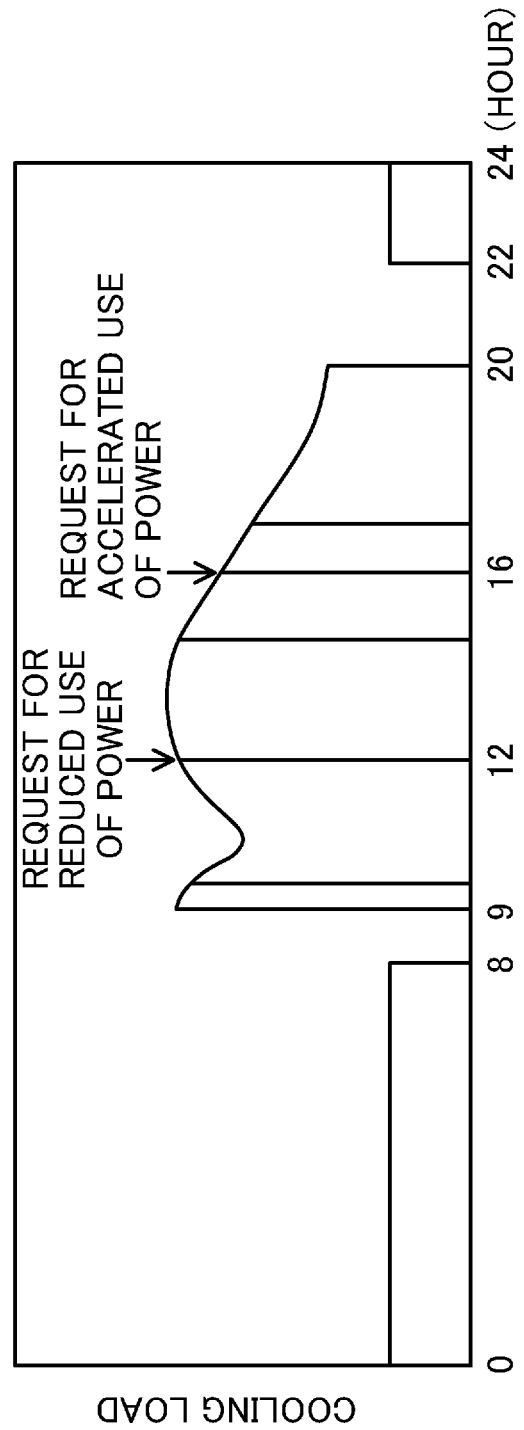

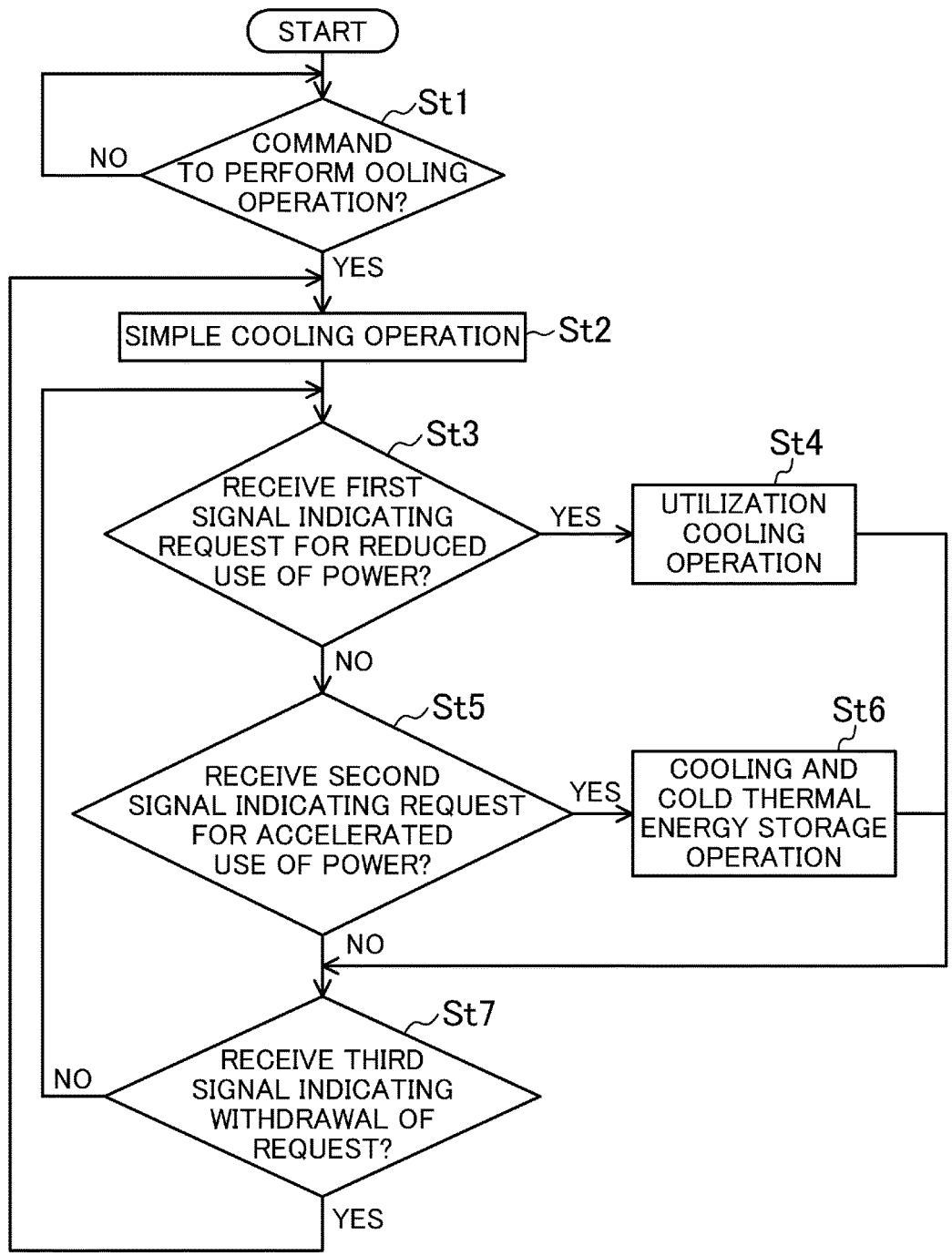

THERMAL STORAGE AIR CONDITIONER

TECHNICAL FIELD

The present invention relates to a thermal storage air conditioner which stores cold thermal energy in a thermal storage tank by utilizing a thermal storage effect of a thermal storage medium.

BACKGROUND ART

Known thermal storage air conditioners include a thermal storage air conditioner which has a thermal storage tank which stores cold thermal energy by utilizing a thermal storage effect of a thermal storage material (i.e., a thermal storage medium) as disclosed, for example, in Patent Document 1. This thermal storage air conditioner performs a utilization cooling operation for cooling, e.g., a room, by utilizing the cold thermal energy stored in the thermal storage tank, a general cooling operation for cooling the room without utilizing the cold thermal energy stored in the thermal storage tank, and a cold thermal energy storage operation for storing cold thermal energy in the thermal storage material.

CITATION LIST

Patent Document

Patent Document 1: Japanese Patent No. 4407582

SUMMARY OF THE INVENTION

Technical Problem

These days, renewable energy generated by photovoltaic power, wind power, geothermal power, etc., is fed to electric power systems of electric power companies.

In these circumstances, when the electricity generated from photovoltaic power, wind power, etc., is unexpectedly large, the feed side may have a surplus of power, which may cause a power failure. In such a case, the power controller (e.g., electric power companies) may send a "request for accelerated use of power" to the power consumer. On the other hand, when the power supplied from the feed side (e.g., electric power companies) nearly reaches a peak, the power controller may send a "request for reduced use of power" to the power consumer. Thus, desirably, the power consumer is ready to deal with both of the "request for accelerated use of power" and the "request for reduced use of power" sent from the power controller.

In view of the foregoing background, it is therefore an object of the invention to provide a thermal storage air conditioner which can deal with both of a "request for reduced use of power" and a "request for accelerated use of power" in the field of thermal storage air conditioners.

Solution to the Problem

To achieve the above object, a thermal storage air conditioner of a first aspect of the invention includes: a thermal storage circuit (61) to which a thermal storage tank (62) is connected, the thermal storage tank (62) accumulating a thermal storage medium; a refrigerant circuit (11) to which an indoor heat exchanger (27) is connected, the indoor heat exchanger (27) cooling a room through evaporation of a refrigerant; a receiving section (101) which receives a signal; and a control section (100) which switches an operation by controlling the thermal storage circuit (61) and the refrigerant circuit (11) based on the signal received in the receiving section (101). The control section (100) implements: a utilization cooling operation in which the thermal storage medium absorbs heat from the refrigerant and in which the refrigerant evaporates in the indoor heat exchanger (27), when the receiving section (101) receives a first signal indicating a request for reduced use of power during an operation in which the room is cooled by the refrigerant evaporating in the indoor heat exchanger (27); and a cooling and cold thermal energy storage operation in which the refrigerant absorbs heat from the thermal storage medium and in which the refrigerant evaporates in the indoor heat exchanger (27), when the receiving section (101) receives a second signal indicating a request for accelerated use of power during the operation in which the room is cooled by the refrigerant evaporating in the indoor heat exchanger (27).

The "operation in which the room is cooled by the indoor heat exchanger (27) serving as an evaporator" may be any operation as long as it is an operation which cools a room. For example, this operation refers to any of the simple cooling operation in which the refrigerant evaporates in the indoor heat exchanger (27) and the thermal storage medium is not circulated, the utilization cooling operation in which the thermal storage medium absorbs heat from the refrigerant and the refrigerant evaporates in the indoor heat exchanger (27), and the cooling and cold thermal energy storage operation in which the refrigerant absorbs heat from the thermal storage medium and the refrigerant evaporates in the indoor heat exchanger (27).

Suppose that in the first aspect of the invention, a power supply shortage occurs and a request for reduced use of power is sent at least in a cooling operation of a room. In this case, the receiving section (101) receives a first signal indicating such a situation. When the receiving section (101) receives the first signal, the control section (100) controls the refrigerant circuit (11) and the thermal storage circuit (61) so that the operation shifts from the cooling operation of the room to the utilization cooling operation. In the utilization cooling operation, the thermal storage medium absorbs heat from the refrigerant, and the refrigerant evaporates in the indoor heat exchanger (27), thereby cooling the room. That is, in this operation, the cooling capacity increases due to the refrigerant cooled by the thermal storage medium. As a result, the power consumption of the thermal storage air conditioner may be reduced.

Suppose that excessive amounts of power are generated and a request for accelerated use of power is sent at least in a cooling operation of a room. In this case, the receiving section (101) receives a second signal indicating such a situation. When the receiving section (101) receives the second signal, the control section (100) controls the refrigerant circuit (11) and the thermal storage circuit (61) so that the operation shifts from the cooling operation of the room to the cooling and cold thermal energy storage operation. In the cooling and cold thermal energy storage operation, the refrigerant absorbs heat from the thermal storage medium, and the refrigerant evaporates in the indoor heat exchanger (27), thereby cooling the room. In this operation, so-called cold thermal energy of the refrigerant is stored in the thermal storage medium. As such, the overall capacity of the thermal storage air conditioner needs to be increased to cool the room sufficiently. This may increase the power consumption of the thermal storage air conditioner.

The second aspect of the invention is that the thermal storage tank (62) has a rated thermal storage capacity greater than a thermal storage capacity required to maintain the utilization cooling operation for a predetermined period of time at a rated cooling capacity. The term "rated cooling capacity" used herein may be defined as a cooling capacity required to process a designed cooling load (i.e., a rated cooling load) of a target space in the utilization cooling operation.

In the second aspect of the invention, a rated thermal storage capacity of the thermal storage tank (62) is determined based on operation time of the utilization cooling operation at a rated cooling capacity. Thus, the utilization cooling operation can be maintained only for the above-mentioned period of time at the rated cooling capacity after the receiving section (101) receives the first signal and the utilization cooling operation is executed. The request for reduced use of power may thus be fulfilled.

Moreover, the thermal storage tank (62) still has space available for further storage of the thermal energy, in a state in which the thermal energy required for the utilization cooling operation is stored in the thermal storage tank (62). Cold thermal energy may be stored in this space. Thus, in the event of another request for accelerated use of power being sent, this request may be fulfilled successfully.

A third aspect of the invention is an embodiment of the second aspect. In the third aspect, the predetermined period of time is one hour.

In the third aspect of the invention, the rated thermal storage capacity of the thermal storage tank (62) is set to a thermal storage capacity at which the utilization cooling operation can be maintained for at least one hour at a rated capacity. This means that the utilization cooling operation performed based on the request for reduced use of power may be maintained for at least one hour at the rated capacity. For example, in general, it takes about one hour to start up another power generator when a power supply shortage occurs. Thus, a continuous utilization operation for one hour may fulfill the request for reduced use of power.

A fourth aspect of the invention is an embodiment of any one of the first to third aspects, in which the operation for cooling the room by the refrigerant evaporating in the indoor heat exchanger (27) is a simple cooling operation in which the refrigerant evaporates in the indoor heat exchanger (27) and in which the thermal storage medium is not circulated.

In the fourth aspect, the operation is switched from the simple cooling operation to the utilization cooling operation if the receiving section (101) receives the first signal during the simple cooling operation. The operation is switched from the simple cooling operation to the cooling and cold thermal energy storage operation if the receiving section (101) receives the second signal during the simple cooling operation.

Advantages of the Invention

According to the first and/or fourth aspect of the invention, the operation can be shifted to the utilization cooling operation immediately after receipt of the first signal in the event of a request for reduced use of power being sent. This may achieve a power-saving operation without decreasing the comfort of the room, and fulfill the request for reduced use of power. In the event of the request for accelerated use of power being sent, the operation can be shifted to the cooling and cold thermal energy storage operation immediately after the receipt of the second signal. This may achieve an operation using a lot of power without decreasing the comfort of the room and while storing so-called cold thermal energy in the thermal storage medium in the thermal storage tank (62). As a result, the request for accelerated use of power can be fulfilled.

According to the second aspect of the invention, the utilization cooling operation performed based on the request for reduced use of power may be maintained for at least a predetermined period of time at the rated capacity. In particular, according to the third aspect of the invention, the utilization cooling operation at the rated cooling capacity can be maintained for at least one hour. It is expected that the power to be supplied may be increased or restored during this period. It is thus possible to provide a thermal storage air conditioner which can reliably fulfill the request for reduced use of power.

BRIEF DESCRIPTION OF THE DRAWINGS

FIG. 6 shows a flow of a refrigerant and a flow of a thermal storage medium in a cooling and cold thermal energy storage operation.

FIG. 7 illustrates changes in the cooling load during a day.

FIG. 8 is a schematic flowchart showing switching among operations during the cooling operation of the air-conditioning system.

DESCRIPTION OF EMBODIMENTS

Embodiments of the present invention will be described in detail below with reference to the drawings. The following embodiments are merely preferred examples in nature, and are not intended to limit the scope, applications, or use of the invention.

Embodiments

<General Description>

A thermal storage air conditioner (10) according to the present embodiment is a system capable of storing cold thermal energy in a thermal storage tank (62), which will be described later, and cooling a room by utilizing the cold thermal energy stored. Further, the thermal storage air conditioner (10) can cool the room even while storing the cold thermal energy in the thermal storage tank (62).

Figure 1:
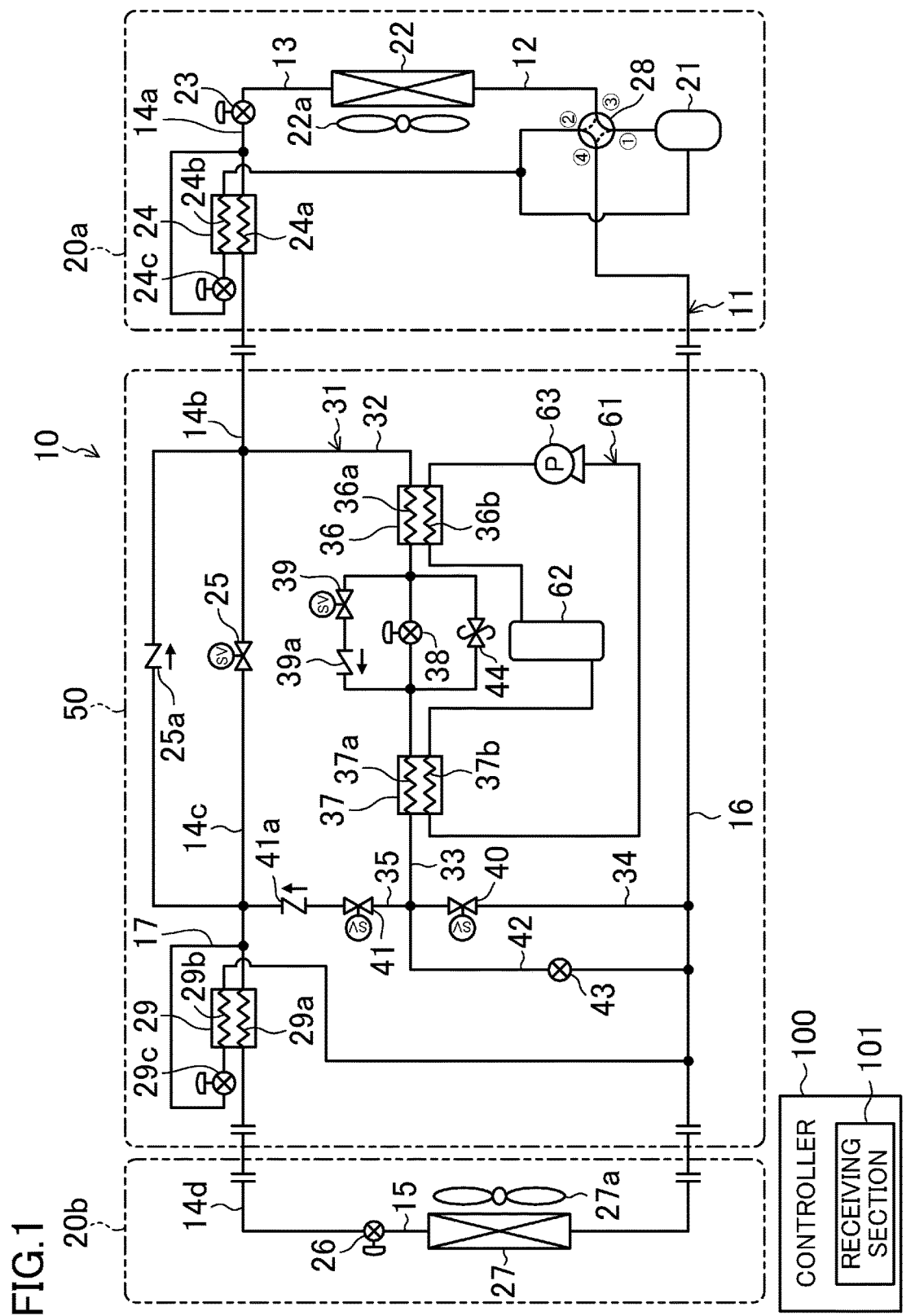
FIG. 1 shows a configuration diagram of an air-conditioning system.

As illustrated in FIG. 1, the thermal storage air conditioner (10) is comprised of an outdoor unit (20*a*), an indoor unit (20*b*), a thermal storage unit (50), and a controller (100) (which corresponds to an operation control section), and includes a refrigerant circuit (11) and a thermal storage circuit (61).

The controller (100) is for controlling an operation of the thermal storage air conditioner (10). The controller (100) controls actuation of a compressor (21) of the refrigerant circuit (11) and a circulation pump (63) of the thermal storage circuit (61), degrees of opening of a plurality of expansion valves (23, 24c, 26, 29c, 38), and opening and closing of a plurality of open/close valves (25, 39, 40, 41).

The controller (100) has a receiving section (101) which receives external signals. For example, the receiving section (101) receives a signal transmitted from a power controller, e.g., an electric power company. More specifically, the receiving section (101) receives a signal indicating a "request for reduced use of power" (i.e., a first signal), a signal indicating a "request for accelerated use of power" (i.e., a second signal), and a signal indicating "withdrawal of the request for reduced use of power, or withdrawal of the request for accelerated use of power" (i.e., a third signal).

The controller (100) performs the utilization cooling operation when the receiving section (101) receives the first signal, the cooling and cold thermal energy storage operation when the receiving section (101) receives the second signal, and the simple cooling operation when the receiving section (101) receives the third signal. Details of these operations will be described later.

<Configuration of Refrigerant Circuit>

The refrigerant circuit (11) is filled with a refrigerant, which circulates to perform a refrigeration cycle. As illustrated in FIG. 1, the refrigerant circuit (11) is typically comprised of a compressor (21), an outdoor heat exchanger (22), an outdoor expansion valve (23), an outdoor-side subcooling heat exchanger (24), a first open/close valve (25), a thermal-storage-side subcooling heat exchanger (29), an indoor expansion valve (26), an indoor heat exchanger (27), and a four-way switching valve (28). Among them, the compressor (21), the outdoor heat exchanger (22), the outdoor expansion valve (23), the outdoor-side subcooling heat exchanger (24), and the four-way switching valve (26) are provided in the outdoor unit (20a). The indoor expansion valve (26) and the indoor heat exchanger (27) are provided in the indoor unit (20b). The first open/close valve (25) and the thermal-storage-side subcooling heat exchanger (29) are provided in the thermal storage unit (50).

The compressor (21) compresses the refrigerant and discharges the compressed refrigerant. The compressor (21) is a variable capacity compressor, the rotational speed (i.e., the operating frequency) of which is varied by an inverter circuit (not shown).

The outdoor heat exchanger (22) is connected to the four-way switching valve (28) through a pipe (12). The outdoor heat exchanger (22) is, for example, a cross-fin-and-tube heat exchanger, and exchanges heat between outdoor air supplied therein by an outdoor fan (22a) arranged in the outdoor unit (20a) and the refrigerant.

The outdoor expansion valve (23) is connected to the outdoor heat exchanger (22) through a pipe (13), and is connected to the outdoor-side subcooling heat exchanger (24) through a pipe (14a). The outdoor expansion valve (23) is configured, for example, as an electronic expansion valve, and adjusts the flow rate of the refrigerant by changing the degree of opening of the valve.

The outdoor-side subcooling heat exchanger (24) has a high-pressure passage (24a) connected to the outdoor expansion valve (23) through the pipe (14a), and a low-pressure passage (24b) connected to the inlet side of the high-pressure passage (24a) and the suction side of the compressor (21). The outdoor-side subcooling heat exchanger (24) is configured to subcool the refrigerant flowing through the high-pressure passage (24a) by exchanging heat between the refrigerant flowing through the high-pressure passage (24a) and the refrigerant flowing through the low-pressure passage (24b). The degree of subcooling of the outlet of the high-pressure passage (24a) is adjusted by changing the degree of opening of the expansion valve (24c).

The first open/close valve (25) is connected to the high-pressure passage (24a) of the outdoor-side subcooling heat exchanger (24) through a pipe (14b), and is connected to the thermal-storage-side subcooling heat exchanger (29) through a pipe (14c). The first open/close valve (25) is configured, for example, as a solenoid valve, and allows or stops the flow of the refrigerant through the pipes (14b, 14c). A check valve (25a) is connected in parallel with the first open/close valve (25). The check valve (25a) is arranged to allow the refrigerant to flow toward the outdoor-side subcooling heat exchanger (24) from the side closer to the thermal-storage-side subcooling heat exchanger (29) in a simple heating operation which will be described later.

The thermal-storage-side subcooling heat exchanger (29) has a high-pressure passage (29a) and a low-pressure passage (29b). One end of the high-pressure passage (29a) is connected to the pipe (14c), and the other end thereof is connected to the indoor expansion valve (26) through a pipe (14d). One end of the low-pressure passage (29b) is connected to the inlet side of the high-pressure passage (29a) through a pipe (17), and the other end thereof is connected to a pipe (16) (i.e., the suction side of the compressor (21)). The thermal-storage-side subcooling heat exchanger (29) is configured to subcool the refrigerant flowing through the high-pressure passage (29a) by exchanging heat between the refrigerant flowing through the high-pressure passage (29a) and the refrigerant flowing through the low-pressure passage (29b). The degree of subcooling of the outlet of the high-pressure passage (29a) is adjusted by changing the degree of opening of the expansion valve (29c).

The indoor expansion valve (26) is connected to the indoor heat exchanger (27) through a pipe (15). The indoor expansion valve (26) is configured, for example, as an electronic expansion valve, and adjusts the circulation rate of the refrigerant by changing the degree of opening of the valve.

The indoor heat exchanger (27) is connected to the four-way switching valve (28) through the pipe (16). The indoor heat exchanger (27) is, for example, a cross-fin-and-tube heat exchanger, and exchanges heat between indoor air supplied therein by an indoor fan (27a) arranged in the indoor unit (20b) and the refrigerant. The air that is heat-exchanged by the indoor heat exchanger (27) is fed into the room again.

The four-way switching valve (28) has four ports. Specifically, a first port of the four-way switching valve (28) is connected to the discharge side of the compressor (21). A second port of the four-way switching valve (28) is connected to the suction side of the compressor (21) via an accumulator (not shown). A third port of the four-way switching valve (28) is connected to the outdoor heat exchanger (22) through the pipe (12). A fourth port of the four-way switching valve (28) is connected to the indoor heat exchanger (27) through the pipe (16). The four-way switching valve (28) switches the connection state of the ports to a first state (the state indicated by the solid lines in FIG. 1) or a second state (the state indicated by broken lines in FIG. 1) according to the operational mode of the thermal storage air conditioner (10).

<Configuration of Bypass Channel>As illustrated in FIG. 1, the refrigerant circuit (11) includes a bypass channel (31). The bypass channel (31) is connected in parallel with the indoor heat exchanger (27), and the refrigerant flows through the bypass channel (31). Specifically, one end of the bypass channel (31) is connected to the pipe (14b) between the outdoor-side subcooling heat exchanger (24) and the first open/close valve (25). The other end of the bypass channel (31) is connected to the pipe (16) between the indoor heat exchanger (27) and the fourth port of the four-way switching valve (28). The bypass channel (31) typically includes a preheating heat exchanger (36), a thermal storage heat exchanger (37), a thermal storage expansion valve (38), and second and third open/close valves (39, 40).

The preheating heat exchanger (36) has a refrigerant path (36a) and a thermal storage path (36b). The refrigerant path (36a) is located along a pipe (32), that is, between one end of the bypass channel (31) and the thermal storage expansion valve (38), and the refrigerant flows through the refrigerant path (36a). The thermal storage path (36b) is connected in series to the thermal storage circuit (61), and a thermal storage medium (which will be described later) flows through the thermal storage path (36b). The preheating heat exchanger (36) exchanges heat between the refrigerant and the thermal storage medium. That is, the preheating heat exchanger (36) exchanges heat between the refrigerant before being heat-exchanged by the thermal storage heat exchanger (37) and the thermal storage medium.

The thermal storage heat exchanger (37) has a refrigerant path (37a) and a thermal storage path (37b). The refrigerant path (37a) is located along a pipe (33) between the thermal storage expansion valve (38) and the third open/close valve (40), and the refrigerant flows through the refrigerant path (37a). The thermal storage path (37b) is connected in series to the thermal storage circuit (61), and the thermal storage medium flows through the thermal storage path (37b). The thermal storage heat exchanger (37) exchanges heat between the refrigerant and the thermal storage medium, thereby making it possible to cool the thermal storage medium, for example. That is, the thermal storage heat exchanger (37) exchanges heat between the refrigerant after being heat-exchanged by the preheating heat exchanger (36) and the thermal storage medium.

The thermal storage expansion valve (38) is connected to a portion between the refrigerant path (36a) of the preheating heat exchanger (36) and the refrigerant path (37a) of the thermal storage heat exchanger (37). The thermal storage expansion valve (38) is configured, for example, as an electronic expansion valve, and adjusts the pressure of the refrigerant by changing the degree of opening of the valve.

The second open/close valve (39) is connected in series to a check valve (39a). The second open/close valve (39) and the check valve (39a) connected in series to each other are connected in parallel to the thermal storage expansion valve (38). The check valve (39a) allows the refrigerant to flow only from the side closer to the preheating heat exchanger (36) toward the thermal storage heat exchanger (37). The third open/close valve (40) is provided on a pipe (34). One end of the pipe (34) is connected to the pipe (33), and the other end of the pipe (34) is connected to the pipe (16).

A pressure release valve (44) is connected in parallel to the thermal storage expansion valve (38). The pressure release valve (44) is for releasing a pressure of the thermal storage heat exchanger (37) when it exceeds an allowable pressure value during an operation of the thermal storage air conditioner (10), for example.

<First Branch Channel>

As illustrated in FIG. 1, the refrigerant circuit (11) further includes a first branch channel (35). One end of the first branch channel (35) is connected to a connection between the pipes (33, 34) of the bypass channel (31), and the other end thereof is connected to the pipe (14c). The first branch channel (35) typically has a fourth open/close valve (41) and a check valve (41a). The fourth open/close valve (41) and the check valve (41a) are connected in series to each other. The check valve (41a) allows the refrigerant to flow only from the side closer to the pipe (33) toward the pipe (14c).

<Second Branch Channel>

As illustrated in FIG. 1, the refrigerant circuit (11) further includes a second branch channel (42). One end of the second branch channel (42) is connected to a connection between the pipes (33, 34) of the bypass channel (31), that is, a connection between the bypass channel (31) and the first branch channel (35). The other end of the second branch channel (42) is connected to the pipe (16). The second branch channel (42) typically has an evaporating pressure adjusting valve (43). The evaporating pressure adjusting valve (43) is for adjusting the evaporating pressure of the refrigerant in the thermal storage heat exchanger (37), and is configured, for example, as an expansion valve.

Note that the evaporating pressure adjusting valve (43) basically maintains a fully-closed state.

<Configuration of Thermal Storage Circuit>

The thermal storage circuit (61) is filled with a thermal storage medium, and a cycle for storing cold thermal energy is performed by circulating the thermal storage medium. The thermal storage circuit (61) typically includes, besides the thermal storage tank (62) and the circulation pump (63), the thermal storage paths (36b, 37b) of the preheating heat exchanger (36) and the thermal storage heat exchanger (37), respectively.

Now, the thermal storage medium will be described. A thermal storage material in which clathrate hydrates are generated when cooled, that is, a thermal storage material having flow properties, is adopted as the thermal storage medium. The thermal storage medium can be such a medium in which a solid component is generated when cooled to a temperature higher than 0° C. and lower than 20° C., for example. The solid component is a component which undergoes phase transitions (i.e., latent heat changes) from liquid at its melting point and is in a heating state. Examples of the thermal storage medium include a tetra-n-butyl ammonium bromide (TBAB) aqueous solution containing tetra-n-butyl ammonium bromide, a trimethylolethane (TME) aqueous solution, and paraffin-based slurry. For example, the state as an aqueous solution of a tetra-n-butyl ammonium bromide aqueous solution is maintained even if it is cooled in a stable manner and turns into a subcooled state in which the temperature of the aqueous solution is lower than a hydrate formation temperature. However, once some trigger is given in this subcooled state, the subcooled solution transitions to a solution containing clathrate hydrates (i.e., transitions to slurry). That is, the subcooled state of the tetra-n-butyl ammonium bromide aqueous solution is changed to the state of slurry with relatively high viscosity due to the generation of clathrate hydrates (hydrate crystals) made of tetra-n-butyl ammonium bromide and water molecules. The subcooled state as used herein refers to a state in which clathrate hydrates are not generated and the state of solution is maintained even when the thermal storage medium reaches a temperature lower than or equal to the hydrate formation temperature. On the other hand, the tetra-n-butyl ammonium bromide aqueous solution in the state of slurry is changed to the state of liquid (i.e., a solution) with relatively high flow properties due to melting of the clathrate hydrates, if the temperature of the aqueous solution becomes higher, by heating, than the temperature at which the hydrates are generated.

In the present embodiment, a tetra-n-butyl ammonium bromide aqueous solution containing tetra-n-butyl ammonium bromide is adopted as the thermal storage medium. In particular, it is recommended that the thermal storage medium has a concentration close to a congruent concentration. In the present embodiment, the congruent concentration is set to about 40%. In this case, the hydrate formation temperature of the tetra-n-butyl ammonium bromide aqueous solution is about 12° C.

Note that the hydrate formation temperature of the tetra-n-butyl ammonium bromide aqueous solution varies according to the concentration of the thermal storage medium. For example, if the thermal storage medium has a concentration of about 20%, the hydrate formation temperature is about 8.5° C. The congruent concentration refers to a concentration of an aqueous solution which does not change before and after the generation of the clathrate hydrates.

The thermal storage tank (62) is a hollow vessel in which the thermal storage medium is stored. For example, the thermal storage tank (62) has a cylindrical shape in which both ends are closed, and is arranged such that its axial direction extends vertically. The thermal storage tank (62) has an outlet and an inlet. For example, the outlet is located higher than the inlet.

The circulation pump (63) circulates the thermal storage medium among the thermal storage tank (62), the preheating heat exchanger (36) and the thermal storage heat exchanger (37) in the thermal storage circuit (61). The thermal storage medium circulates such that the thermal storage medium having flowed out of the thermal storage tank (62) sequentially passes through the thermal storage path (36b) of the preheating heat exchanger (36), and then the thermal storage path (37b) of the thermal storage heat exchanger (37) via the circulation pump (63), and flows into the thermal storage tank (62). The controller (100) controls the on/off operations of the circulation pump (63) and the flow rate of the thermal storage medium.

The above configurations show that the thermal storage circuit (61) is a closed circuit.

<Operation of Thermal Storage Air Conditioner>

Examples of operational modes of the thermal storage air conditioner (10) include a simple cooling operation, simple heating operation, cold thermal energy storage operation, utilization cooling operation, and cooling and cold thermal energy storage operation. The controller (100) controls various devices in the refrigerant circuit (11) and the thermal storage circuit (61) to perform these operations.

The simple cooling operation is performed to cool the room using only the cold thermal energy obtained through a cooling cycle of the refrigerant circuit (11). The simple heating operation is performed to heat the room using only the warm thermal energy obtained through a heating cycle of the refrigerant circuit (11). The cold thermal energy storage operation is performed to store, in the thermal storage tank (62), the cold thermal energy obtained through a cold thermal energy storage cycle of the thermal storage circuit (61). The utilization cooling operation is performed to cool the room using the thermal storage medium in the thermal storage tank (62) as a cold thermal energy source. The cooling and cold thermal energy storage operation is performed to cool the room using, in the refrigerant circuit (11), only the cold thermal energy obtained through the cooling cycle, while storing, in the thermal storage circuit (61), the cold thermal energy obtained by the cold thermal energy storage cycle. That is, the cold thermal energy storage and the cooling are performed simultaneously in the cooling and cold thermal energy storage operation.

—Simple Cooling Operation—

Figure 2:
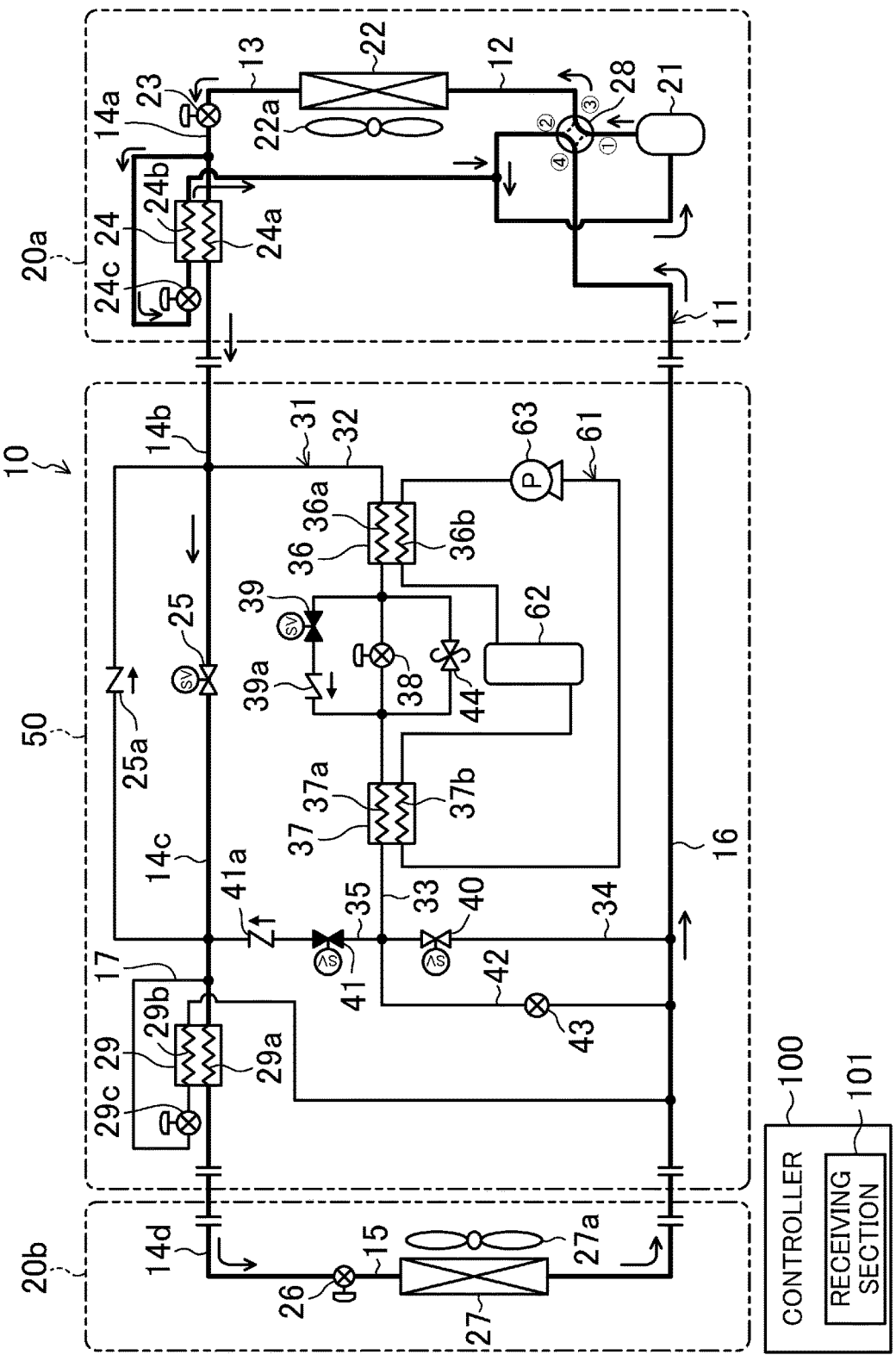
FIG. 2 shows a flow of a refrigerant in a simple cooling operation.

As illustrated in FIG. 2, in the simple cooling operation, the refrigerant circuit (11) performs a cooling cycle in which the outdoor heat exchanger (22) serves as a condenser and the indoor heat exchanger (27) serves as an evaporator. The refrigerant does not flow into the bypass channel (31) and the first branch channel (35), and the thermal storage circuit (61) does not circulate the thermal storage medium. Specifically, in the bypass channel (31), the degree of opening of the thermal storage expansion valve (38) is set to a fully-closed state, and the open/close valves (39, 41) of the bypass channel (31) and the first branch channel (35) are set to a closed state. However, the open/close valve (40) of the bypass channel (31) is set to an open state to prevent the refrigerant from accumulating in the refrigerant path (37a) of the thermal storage heat exchanger (37). The circulation pump (63) in the thermal storage circuit (61) is stopped.

In the refrigerant circuit (11), the four-way switching valve (28) is set to the first state, and the first open/close valve (25) is set to an open state. The degree of opening of the outdoor expansion valve (23) is set to a fully-open state; that of the expansion valve (29c) of the thermal-storage-side subcooling heat exchanger (29) is set to a fully-closed state; and that of the indoor expansion valve (26) is set to a predetermined degree (i.e., such a degree of opening which allows the refrigerant at the exit of the indoor heat exchanger (27) to have a target degree of superheat). The compressor (21), the outdoor fan (22a) and the indoor fan (27a) are actuated.

The refrigerant discharged from the compressor (21) passes through the pipe (12), flows into the outdoor heat exchanger (22), dissipates heat to the outdoor air while passing through the outdoor heat exchanger (22), and is condensed. The refrigerant that has been condensed by the outdoor heat exchanger (22) passes through the pipe (13) and the outdoor expansion valve (23), flows into the outdoor-side subcooling heat exchanger (24), and is further cooled. The further cooled refrigerant passes through the pipes (14b, 14c, 14d), the first open/close valve (25) and the high-pressure passage (29a) of the thermal-storage-side subcooling heat exchanger (29), and flows into the indoor expansion valve (26), which decompresses the refrigerant. The refrigerant decompressed by the indoor expansion valve (26) passes through the pipe (15), flows into the indoor heat exchanger (27), and absorbs heat from the indoor air while passing through indoor heat exchanger (27) and evaporates. The indoor air is cooled in this manner. The refrigerant evaporated by the indoor heat exchanger (27) is taken into the compressor (21) through the pipe (16), and is compressed again.

—Simple Heating Operation—

Figure 3:
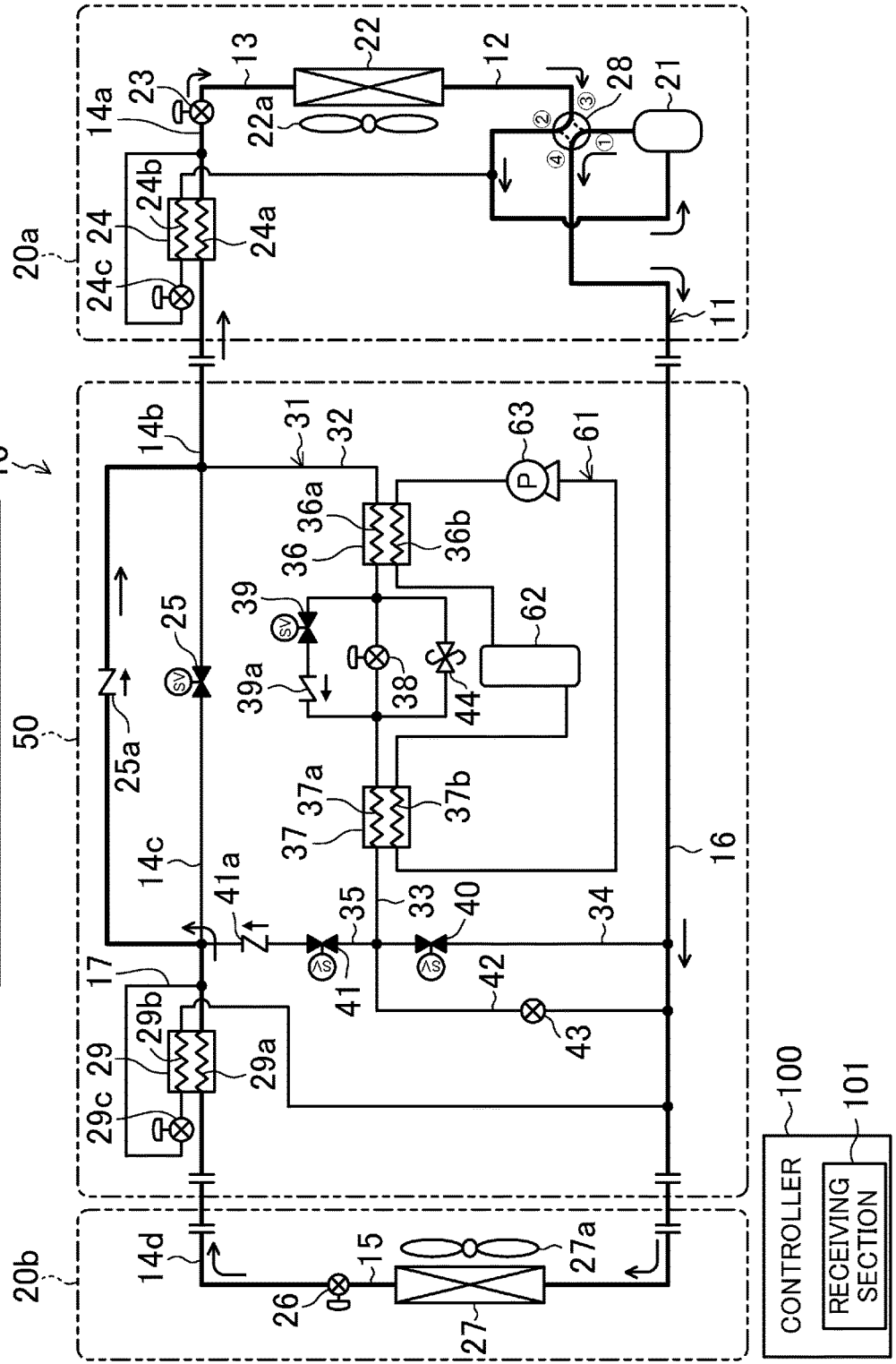
FIG. 3 shows a flow of a refrigerant in a simple heating operation.

As illustrated in FIG. 3, in the simple heating operation, the refrigerant circuit (11) performs a heating cycle in which the indoor heat exchanger (27) serves as a condenser and the outdoor heat exchanger (22) serves as an evaporator. Similarly to the simple cooling operation, the refrigerant does not flow into the bypass channel (31) and the first branch channel (35), and the thermal storage circuit (61) does not circulate the thermal storage medium.

In the refrigerant circuit (11), the four-way switching valve (28) is set to the second state. The degree of opening of the indoor expansion valve (26) is set to a predetermined degree (i.e., such a degree of opening which allows the refrigerant at the exit of the indoor heat exchanger (27) to have a target degree of superheat). The expansion valves (29c, 24c) of the subcooling heat exchangers (29, 24) are set to a fully-closed state; the first open/close valve (25) is set to a closed state; and the degree of opening of the outdoor expansion valve (23) is set to a predetermined degree (i.e., such a degree of opening which allows the refrigerant at the exit of the outdoor heat exchanger (22) to have a target degree of superheat). The compressor (21), the outdoor fan (22a) and the indoor fan (27a) are actuated.

The refrigerant discharged from the compressor (21) passes through the pipe (16), flows into the indoor heat exchanger (27), dissipates heat to the indoor air while passing through the indoor heat exchanger (27), and is condensed. The indoor air is heated at this moment. The refrigerant that has been condensed by the indoor heat exchanger (27) passes through the pipes (15, 14d-14a), the indoor expansion valve (26), the high-pressure passages (29a, 24a) of the subcooling heat exchangers (29, 24) and the check valve (25a) and flows into the outdoor expansion valve (23), which decompresses the refrigerant. The decompressed refrigerant passes through the pipe (13), flows into the outdoor heat exchanger (22), absorbs heat from the outdoor air while passing through outdoor heat exchanger (22), and evaporates. The evaporated refrigerant is taken into the compressor (21) through the pipe (12) and compressed again.

—Cold Thermal Energy Storage Operation—

Figure 4:
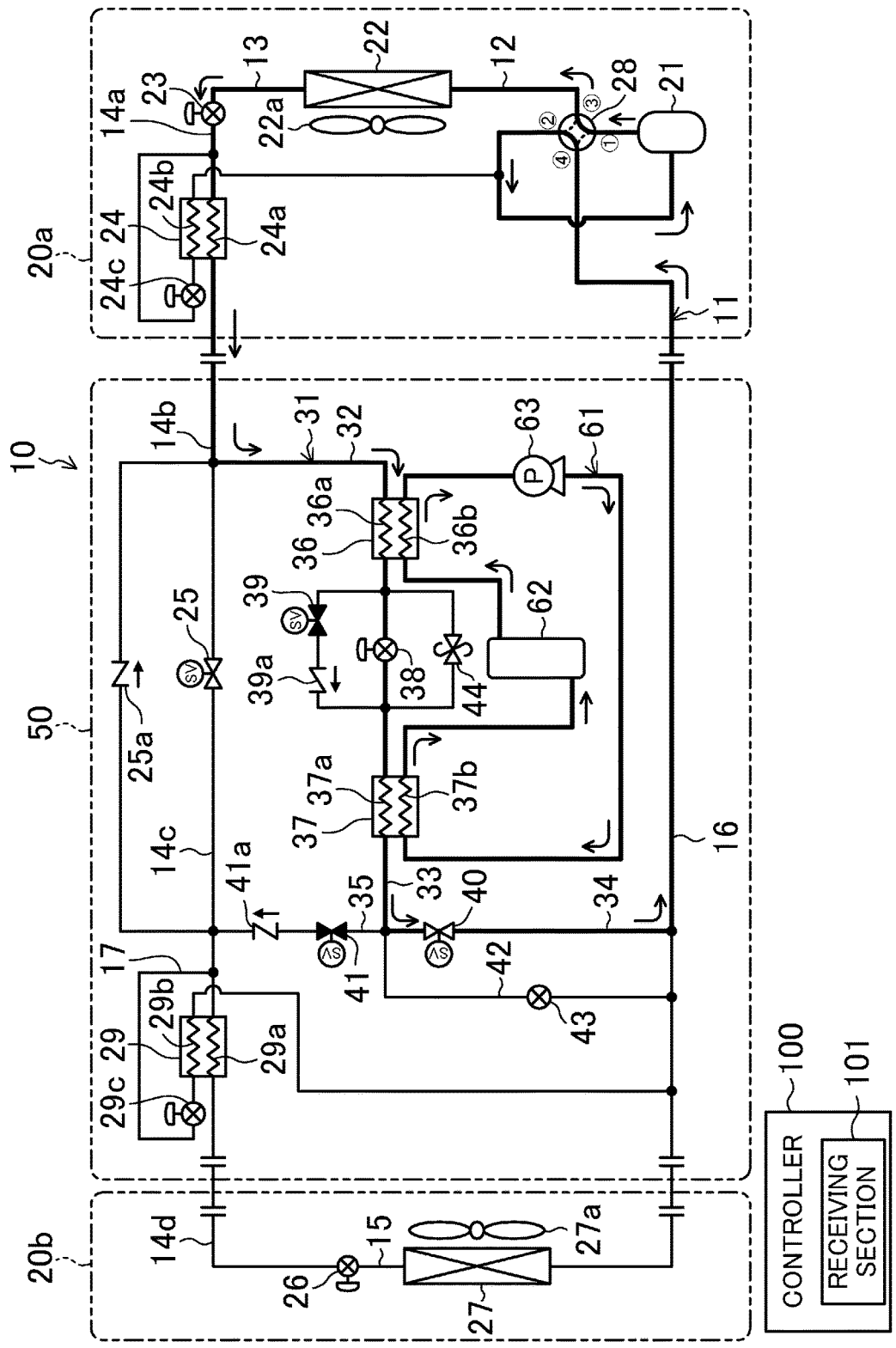
FIG. 4 shows a flow of a refrigerant and a flow of a thermal storage medium in a cold thermal energy storage operation.

As illustrated in FIG. 4, in the cold thermal energy storage operation, the refrigerant that has been condensed and cooled by the outdoor heat exchanger (22) and the refrigerant path (36a) of the preheating heat exchanger (36) evaporates in the refrigerant path (37a) of the thermal storage heat exchanger (37). Thus, the thermal storage medium in the thermal storage path (37b) is cooled and stored in the thermal storage tank (62). In the refrigerant circuit (11), the refrigerant flows into the bypass channel (31), but does not flow into the first branch channel (35). The thermal storage circuit (61) performs a cold thermal energy storage cycle in which the thermal storage medium is circulated so that the thermal storage medium cooled by the thermal storage heat exchanger (37) is stored in the thermal storage tank (62).

Specifically, the four-way switching valve (28) is set to the first state; the third open/close valve (40) is set to an open state; and the second open/close valve (39) and the fourth open/close valve (41) are set to a closed state. The first open/close valve (25) is set to an open state. With the first open/close valve (25) open, a liquid refrigerant accumulates in the pipe (i.e., a liquid pipe) extending from a junction connected to the bypass channel (31) to the indoor expansion valve (26). The refrigerant in this pipe is in the same state as in the simple cooling operation, which avoids the generation of excess refrigerant. This is why the first open/close valve (25) is set to an open state. Further, the outdoor expansion valve (23) is set to a fully-open state; the expansion valves (24c, 29c) of the subcooling heat exchangers (24, 29) are set to a fully-closed state; the indoor expansion valve (26) is set to a fully-closed state; and the degree of opening of the thermal storage expansion valve (38) is set to a predetermined degree (i.e., such a degree of opening which allows the refrigerant at the entry of the refrigerant path (37a) of the thermal storage heat exchanger (37) to have a predetermined target evaporation temperature). The compressor (21) is actuated at a generally constant rotational speed. The outdoor fan (22a) is actuated, and the indoor fan (27a) is stopped.

The refrigerant discharged from the compressor (21) passes through the pipe (12), flows into the outdoor heat exchanger (22), dissipates heat to the outdoor air in the outdoor heat exchanger (22), and is condensed. The condensed refrigerant passes through the pipes (13, 14a), the outdoor expansion valve (23), and the high-pressure passage (24a) of the outdoor-side subcooling heat exchanger (24), and flows into the pipe (14b). With the first open/close valve (25) open, the refrigerant accumulates in a portion of the pipe (14b) extending from the junction connected to the bypass channel (31) to the indoor expansion valve (26), and also flows to the bypass channel (31). Thus, the refrigerant is further cooled in the refrigerant path (36a) of the preheating heat exchanger (36). The refrigerant which has flowed out of the preheating heat exchanger (36) is decompressed by the thermal storage expansion valve (38), and then absorbs heat from the thermal storage medium in the refrigerant path (37a) of the thermal storage heat exchanger (37) and evaporates. The evaporated refrigerant passes through the third open/close valve (40) and the pipe (34), and flows out of the bypass channel (31) to flow into the pipe (16). The refrigerant thereafter passes through the four-way switching valve (28) and is taken into the compressor (21) to be compressed again.

In the thermal storage circuit (61), the circulation pump (63) is actuated. The thermal storage medium in the thermal storage tank (62) flows out of the tank (62) to flow into the thermal storage path (36b) of the preheating heat exchanger (36). The thermal storage medium is heated, while passing through the thermal storage path (36b), by the refrigerant flowing through the refrigerant path (36a). The heated thermal storage medium flows into the thermal storage path (37b) of the thermal storage heat exchanger (37) via the circulation pump (63). The thermal storage medium is cooled, while passing through the thermal storage path (37b), by the refrigerant flowing through the refrigerant path (37a). The cooled thermal storage medium flows into the thermal storage tank (62). The cold thermal energy obtained by the thermal storage effect of the thermal storage medium is stored in the thermal storage tank (62) in this manner.

—Utilization Cooling Operation—

Figure 5:
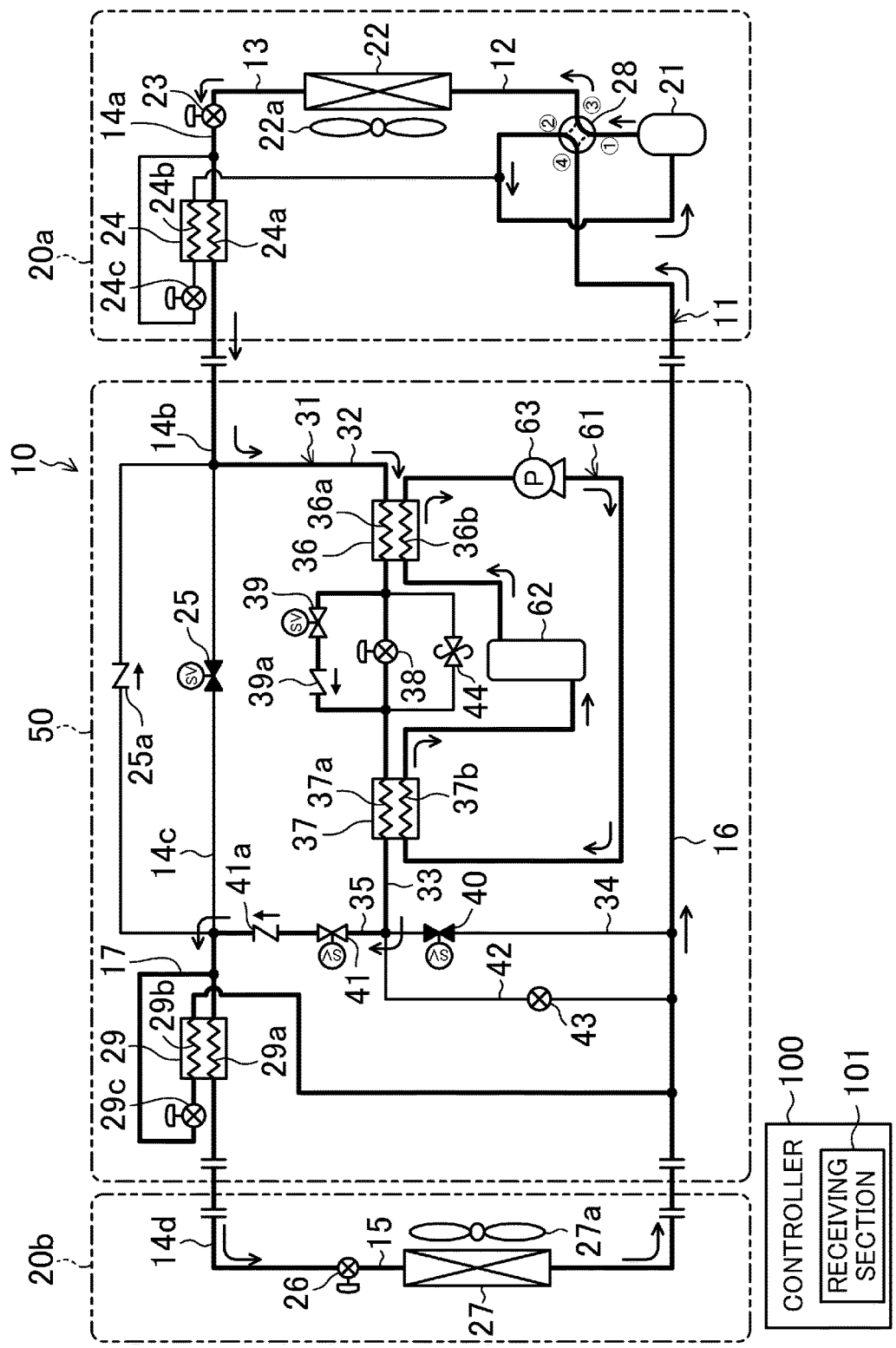
FIG. 5 shows a flow of a refrigerant and a flow of a thermal storage medium in a utilization cooling operation.

As illustrated in FIG. 5, in the utilization cooling operation, a room is cooled using the cold thermal energy stored in the thermal storage tank (62) and the cold thermal energy obtained in the refrigeration cycle of the refrigerant circuit (11). That is, the refrigerant that has been condensed and cooled by the outdoor heat exchanger (22) obtains the cold thermal energy from the thermal storage medium in the preheating heat exchanger (36) and the thermal storage heat exchanger (37), and then evaporates in the indoor heat exchanger (27), thereby cooling the indoor air. The thermal storage medium circulates in the thermal storage circuit (61) such that the thermal storage medium having flowed out of the thermal storage tank (62) sequentially passes through the preheating heat exchanger (36) and the thermal storage heat exchanger (37) and flows into the thermal storage tank (62) again.

In this case, the outdoor heat exchanger (22) serves as a condenser and the indoor heat exchanger (27) serves as an evaporator in the refrigerant circuit (11). Particularly in the bypass channel (31), both of the preheating heat exchanger (36) and the thermal storage heat exchanger (37) serve as subcoolers (i.e., radiators), and the refrigerant flows to the first branch channel (35) at an intermediate point of the bypass channel (31).

Specifically, the four-way switching valve (28) is set to the first state; the first open/close valve (25) and the third open/close valve (40) are set to a closed state; and the second open/close valve (39) and the fourth open/close valve (41) are set to an open state. The outdoor expansion valve (23) and the thermal storage expansion valve (38) are set to a fully-open state; the expansion valve (24c) of the outdoor-side subcooling heat exchanger (24) is set to a fully-closed state; and the degree of opening of the indoor expansion valve (26) is set to a predetermined degree (i.e., such a degree of opening which allows the refrigerant at the exit of the indoor heat exchanger (27) to have a target degree of superheat). The compressor (21), the outdoor fan (22a) and the indoor fan (27a) are actuated.

The refrigerant discharged from the compressor (21) passes through the pipe (12), flows into the outdoor heat exchanger (22), dissipates heat to the outdoor air in the outdoor heat exchanger (22), and is condensed. The condensed refrigerant passes through the fully-opened outdoor expansion valve (23) and the high-pressure passage (24a) of the outdoor-side subcooling heat exchanger (24) and flows into the pipe (14b). With the first open/close valve (25) closed, the refrigerant flows into the bypass channel (31) at an intermediate point of the pipe (14b). The refrigerant which has flowed into the bypass channel (31) is further cooled, while passing through the refrigerant path (36a) of the preheating heat exchanger (36), by the thermal storage medium flowing through the thermal storage path (36b). The refrigerant then passes through the fully-opened thermal storage expansion valve (38) or the second open/close valve (39) and flows into the thermal storage heat exchanger (37). The refrigerant which has flowed into the thermal storage heat exchanger (37) is further cooled, while passing through the refrigerant path (37a), by the thermal storage medium flowing through the thermal storage path (37b). This refrigerant passes through the first branch channel (35) and flows into the pipe (14c). The refrigerant thereafter flows into the thermal-storage-side subcooling heat exchanger (29) to be further cooled. The refrigerant further cooled passes through the pipe (14d) and flows into the indoor expansion valve (26). The refrigerant is decompressed by the indoor expansion valve (26), and then absorbs heat from indoor air in the indoor heat exchanger (27) and evaporates. The indoor air is cooled in this manner. The evaporated refrigerant passes through the pipe (16) and the four-way switching valve (28), and is taken into the compressor (21) and compressed again.

In the thermal storage circuit (61), the circulation pump (63) is actuated. The thermal storage medium in the thermal storage tank (62) flows out of the tank (62) to flow into the thermal storage path (36b) of the preheating heat exchanger (36). The thermal storage medium absorbs heat, while passing through the thermal storage path (36b), from the refrigerant flowing through the refrigerant path (36a). The thermal storage medium which has absorbed heat flows into the thermal storage path (37b) of the thermal storage heat exchanger (37) via the circulation pump (63). The thermal storage medium further absorbs heat, while passing through the thermal storage path (37b), from the refrigerant flowing through the refrigerant path (37a). The thermal storage medium which has further absorbed heat flows into the thermal storage tank (62). The cold thermal energy is given to the refrigerant from the thermal storage medium in this manner.

—Cooling and Cold Thermal Energy Storage Operation—

As illustrated in FIG. 6, the cooling and cold thermal energy storage operation performs a cooling cycle in which the refrigerant circulates in the refrigerant circuit (11) such that the refrigerant that has been condensed in the outdoor heat exchanger (22) evaporates in the indoor heat exchanger (27). In particular, part of the refrigerant flows to the bypass channel (31), as well, in the refrigerant circuit (11). In the cooling and cold thermal energy storage operation, the thermal storage circuit (61) performs a cold thermal energy storage cycle in which the thermal storage medium is cooled by the refrigerant in the thermal storage heat exchanger (37) and accumulated in the thermal storage tank (62). That is, the cooling cycle and the cold thermal energy storage cycle are simultaneously performed.

In this case, the outdoor heat exchanger (22) serves as a condenser and the indoor heat exchanger (27) serves as an evaporator in the refrigerant circuit (11). Particularly in the bypass channel (31), the preheating heat exchanger (36) serves as a subcooler (i.e., a radiator), and the thermal storage heat exchanger (37) serves as an evaporator. Note that the refrigerant does not flow into the first branch channel (35).

Specifically, the four-way switching valve (28) is set to the first state; the first open/close valve (25) and the third open/close valve (40) are set to an open state; and the second open/close valve (39) and the fourth open/close valve (41) are set to a closed state. The outdoor expansion valve (23) is set to a fully-open state; the expansion valve (24c) of the outdoor-side subcooling heat exchanger (24) is fully closed; and the degrees of opening of the thermal storage expansion valve (38) and the indoor expansion valve (26) are controlled by the controller (100) to adjust the flow rate of the refrigerant. The compressor (21), the outdoor fan (22a), and the indoor fan (27a) are actuated.

The refrigerant discharged from the compressor (21) passes through the pipe (12), flows into the outdoor heat exchanger (22), dissipates heat to the outdoor air in the outdoor heat exchanger (22), and is condensed. The condensed refrigerant passes through the fully-opened outdoor expansion valve (23) and the high-pressure passage (24a) of the outdoor-side subcooling heat exchanger (24). Since the first open/close valve (25) is opened and the thermal storage expansion valve (38) is not fully closed, the refrigerant which has flowed out of the outdoor-side subcooling heat exchanger (24) diverges from an intermediate point of the pipe (14b) into a flow toward the first open/close valve (25) and a flow toward the bypass channel (31).

The refrigerant which has flowed toward the first open/close valve (25) passes through the pipe (14c) and flows into the high-pressure passage (29a) of the thermal-storage-side subcooling heat exchanger (29) to be further cooled. The refrigerant further cooled passes through the pipe (14d) and flows into the indoor expansion valve (26), which decompresses the refrigerant. The refrigerant decompressed by the indoor expansion valve (26) absorbs heat from the indoor air in the indoor heat exchanger (27). The indoor air is cooled in this manner.

On the other hand, the refrigerant which has flowed toward the bypass channel (31) passes through the pipe (32) and flows into the refrigerant path (36a) of the preheating heat exchanger (36). The refrigerant heats the thermal storage medium flowing through the thermal storage path (36b) while passing through the refrigerant path (36a). The clathrate hydrates contained in the thermal storage medium flowing out of the thermal storage tank (62) are melted through this heating. Consequently, it is possible to prevent a clogging of the thermal storage circuit (61) which may occur due to a large amount of clathrate hydrates generated in the thermal storage medium in the pipes (including the thermal storage path (37b) of the thermal storage heat exchanger (37)) through which the thermal storage medium passes after passing through the preheating heat exchanger (36).

In particular, the refrigerant is not cooled by the outdoor-side subcooling heat exchanger (24) in the cooling and cold thermal energy storage operation, because, if cooled by the outdoor-side subcooling heat exchanger (24), the refrigerant may have reduced effect of heating the thermal storage medium in the preheating heat exchanger (36), and may easily cause a clogging of the thermal storage circuit (61) due to the clathrate hydrates.

The refrigerant which has heated the thermal storage medium in the preheating heat exchanger (36), and thus become cooler, flows out of the preheating heat exchanger (36), and is decompressed by the thermal storage expansion valve (38). The refrigerant thereafter absorbs heat, while passing through the refrigerant path (37a), from the thermal storage medium flowing through the thermal storage path (37b) and evaporates in the thermal storage heat exchanger (37). The evaporated refrigerant flows through the third open/close valve (40) and the pipe (34), and merges with the refrigerant which has passed through the indoor heat exchanger (27) in the pipe (16). The merged refrigerant passes through the four-way switching valve (28), and is taken into the compressor (21) and compressed again.

In the thermal storage circuit (61), the circulation pump (63) is actuated. The thermal storage medium in the thermal storage tank (62) flows out of the tank (62) to flow into the thermal storage path (36b) of the preheating heat exchanger (36). The thermal storage medium absorbs heat, and is thus heated, from the refrigerant flowing through the refrigerant path (36a), while passing through the thermal storage path (36b). The clathrate hydrates contained in the thermal storage medium is melted through the heat. The thermal storage medium which has absorbed heat flows into the thermal storage path (37b) of the thermal storage heat exchanger (37) via the circulation pump (63). The thermal storage medium is cooled, while passing through the thermal storage path (37b), by the refrigerant flowing through the refrigerant path (37a). The cooled thermal storage medium flows into the thermal storage tank (62). The cold thermal energy is stored in the thermal storage tank (62) in this manner.

The above description provides an example cool storage operation in which the evaporating pressure adjusting valve (43) is set to the fully-closed state and the third open/close valve (40) is set to the open state. However, the third open/close valve (40) may be set to the closed state, and the degree of opening of the evaporating pressure adjusting valve (43) may be adjusted to a predetermined degree in the cooling and cold thermal energy storage operation. In this case, the refrigerant which has flowed out of the thermal storage heat exchanger (37) is decompressed by the evaporating pressure adjusting valve (43), and sequentially passes through the pipe (16) and the four-way switching valve (28) to be taken into the compressor (21). Such control allows the refrigerant in the thermal storage heat exchanger (37) to have an evaporating pressure higher than the inlet pressure of the compressor (21), which contributes to preventing the refrigerant in the thermal storage heat exchanger (37) from having an evaporation temperature that is too low. It is thus possible to prevent the thermal storage medium from being cooled too much in the thermal storage heat exchanger (37), and the clathrate hydrates from being generated in a large amount. As a result, the efficiency of the circulation of the thermal storage medium may be prevented from being decreased.

<Operations at Request for Reduced Use of Power, Request for Accelerated Use of Power, and Withdrawal of the Requests>

During a cooling operation in which the indoor heat exchanger (27) serves as an evaporator, operational modes of the thermal storage air conditioner (10) are switched according to a signal indicating a request relating to the use of power. Control over such switching will be described with reference to FIG. 8.

For example, a command to perform a cooling operation is input to the controller (100) (Step St1) when a user selects "COOL" on a controller (e.g., a remote controller). The process then moves to Step St2 to perform a simple cooling operation. In the simple cooling operation, the thermal storage circuit (61) stays at rest, and the refrigerant circuit (11) performs a refrigeration cycle in which the refrigerant evaporates in the indoor heat exchanger (27), as described above.

Suppose that in the simple cooling operation, the power supplied from the feed side nearly reached a peak, and the power controller (e.g., an electric power company) sent a signal (a first signal) indicating a request for reduced use of power. When the receiving section (101) of the controller (100) receives the first signal (Step St3), the controller (100) controls various components of the refrigerant circuit (11) and the thermal storage circuit (61) so that the operation shifts from the simple cooling operation to the utilization cooling operation (Step St4). In the utilization cooling operation thus performed, the cold thermal energy of the thermal storage medium is used to subcool the refrigerant in the refrigerant circuit (11). As a result, the overall power consumption of the thermal storage air conditioner (10) is reduced, which may fulfill the request for reduced use of power.

Suppose that in the simple cooling operation, larger amounts of electricity than usual were generated from photovoltaic power, wind power, etc., by power generation facilities, and the power controller sent a signal (a second signal) indicating a request for accelerated use of power. When the receiving section (101) of the controller (100) receives the second signal (Step St5), the controller (100) controls various components of the refrigerant circuit (11) and the thermal storage circuit (61) so that the operation shifts from the simple cooling operation to the cooling and cold thermal energy storage operation (Step St6). In the cooling and cold thermal energy storage operation thus performed, the thermal storage medium is cooled by the refrigerant. As a result, the overall power consumption of the thermal storage air conditioner (10) increases, while the cold thermal energy is stored in the thermal storage medium. The overall power consumption of the thermal storage air conditioner (10) thus increases, which may fulfill the request for accelerated use of power.

Suppose that in the utilization cooling operation or the cooling and cold thermal energy storage operation, the power controller sent a signal (a third signal) indicating withdrawal of the request for reduced or accelerated use of power. When the receiving section (101) of the controller (100) receives the third signal (Step St7), the controller (100) controls various components of the refrigerant circuit (11) and the thermal storage circuit (61) so that the operation shifts from the utilization cooling operation or the cooling and cold thermal energy storage operation to the simple cooling operation (Step St2). Note that the control in the event of receipt of the third signal is merely a non-limiting example, and other steps may be taken.

<Thermal Storage Capacity of Thermal Storage Tank>

A rated thermal storage capacity (a designed thermal storage capacity) of the thermal storage tank (62) is determined based on operation time T1 of the utilization cooling operation at a rated cooling capacity. Specifically, it is recommended that a rated thermal storage capacity C1 of the thermal storage tank (62) be such a capacity at which a utilization cooling operation can be maintained for at least 1 hour as the operation time T1, under the condition that the utilization cooling operation is performed at a rated cooling capacity. The "rated cooling capacity" used herein may be defined as a cooling capacity required to process a rated air-conditioning load (which is designed in advance) in a room.

For example, in general, it takes about one hour to start up another power generator when the demand for power peaks and a power supply shortage occurs. Setting the rated thermal storage capacity C1 to be more than or equal to the above thermal storage capacity may contribute to the withdrawal of the request for reduced use of power in the utilization cooling operation. Note that the operation time T1 may be two or three hours.

It is recommended that the actual thermal storage capacity Ca of the thermal storage tank (62) be set to be greater than the rated thermal storage capacity C1, and that the following equation, i.e., $Ca=\alpha \times C1$ ($1.1<\alpha<3.0$) be satisfied.

For example, suppose that a thermal storage amount corresponding to the rated thermal storage capacity C1 is stored in the thermal storage tank (62) during the night. In this state, cold thermal energy cannot be stored any more, even when the request for accelerated use of power is received and the cooling and cold thermal energy storage operation is performed. Thus, the request for accelerated use of power may not be fulfilled.

To avoid this, the actual thermal storage capacity Ca of the thermal storage tank (62) is set to be greater than the rated thermal storage capacity C1, so that the cold thermal energy can be stored in the thermal storage tank (62) and the request for accelerated use of power can be fulfilled even under the conditions described above.

It takes, for example, about thirty minutes to reduce, for example, the output of the power generation plant in the event of the request for accelerated use of power being sent. It is thus recommended that the actual thermal storage capacity C1 of the thermal storage tank (62) be determined in consideration of a thermal storage capacity C2 at which the cooling and cold thermal energy storage operation can be maintained for at least 0.5 hours at a rated cooling capacity. The actual thermal storage capacity Ca of the thermal storage tank (62) is set to be C1+C2. Thus, the cooling and cold thermal energy storage operation can be maintained for at least thirty minutes at a rated cooling capacity even under the conditions described above, thereby making it possible to reliably fulfill the request for accelerated use of power.

Advantages of Embodiment

In the present embodiment, in the event of receipt of the "request for reduced use of power" at twelve noon, the thermal storage air conditioner (10) which has received the first signal performs the utilization cooling operation, as illustrated in FIG. 7, for example. The "request for reduced use of power" may thus be dealt with quickly.

The thermal storage capacity Ca of the thermal storage tank (62) is greater than the thermal storage capacity C1 required to maintain one-hour utilization cooling operation at a rated cooling capacity. Thus, the "request for reduced use of power," which is usually withdrawn in a period of minutes to about an hour, can be dealt with successfully.

Further, in the event of receipt of the "request for accelerated use of power" at 4 p.m., the thermal storage air conditioner (10) which has received the second signal performs the cooling and cold thermal energy storage operation. The "request for accelerated use of power" may thus be dealt with quickly.

The thermal storage capacity Ca of the thermal storage tank (62) is greater than C1, and satisfies the relationship $Ca=\alpha \times C1$($1.1<\alpha<3.0$) or $Ca=C1+C2$. Thus, the "request for accelerated use of power," which is withdrawn usually in about thirty minutes, can be dealt with successfully.

Other Embodiments

The above embodiment may also be configured as follows. In the embodiment, a reservoir for accumulating the thermal storage medium is configured as a single thermal storage tank (62). However, the reservoir may be configured as two or more thermal storage tanks. For example, the reservoir is configured as two thermal storage tanks. In this case, a rated thermal storage capacity of a first thermal storage tank may be the above-described C1, and a thermal storage capacity of a second thermal storage tank may be C1, 2×C1, or C2. In this case, it is recommended that the reservoir be configured such that the second reservoir tank can be added on the first reservoir tank. In addition, in the case of using two or more thermal storage tanks, the tanks do not necessarily have the same thermal storage capacity (or size).

The control section (100) of the above embodiment shifts the operation from the simple cooling operation to the utilization cooling operation if the receiving section (101) receives the first signal during the simple cooling operation. Further, the control section (100) shifts the operation from the simple cooling operation to the cooling and cold thermal energy storage operation if the receiving section (101) receives the second signal during the simple cooling operation. However, the control section (100) may shift the operation from the cooling and cold thermal energy storage operation to the utilization cooling operation if the receiving section (101) receives the first signal during the cooling and cold thermal energy storage operation. Further, the control section (100) may shift the operation from the utilization cooling operation to the cooling and cold thermal energy storage operation if the receiving section (101) receives the second signal during the utilization cooling operation.

The refrigerant circuit (11) does not need to have the subcooling heat exchanger (24).

The air-conditioning system (10) may be configured such that in the utilization cooling operation, the refrigerant discharged from the compressor (21) flows directly in the preheating heat exchanger (36) without passing through the outdoor heat exchanger (22) and the subcooling heat exchanger (24).

The thermal storage medium may be any other thermal storage materials besides a tetra-n-butyl ammonium bromide aqueous solution containing tetra-n-butyl ammonium bromide, as long as the thermal storage medium is such a medium in which a solid component is generated when cooled to a temperature higher than 0° C. and lower than 20° C.

INDUSTRIAL APPLICABILITY

As can be seen from the foregoing description, the present invention is useful when used as a thermal storage air conditioner storing cold thermal energy in a thermal storage tank.

DESCRIPTION OF REFERENCE CHARACTERS

10 Air-Conditioning System (Thermal Storage Air Conditioner)

11 Refrigerant Circuit
22 Outdoor Heat Exchanger (Heat-Source-Side Heat Exchanger)
23 Indoor Heat Exchanger (Utilization-Side Heat Exchanger)
37 Thermal Storage Heat Exchanger
61 Thermal Storage Circuit
62 Thermal Storage Tank
63 Circulation Pump
100 Controller
101 Receiving Section

The invention claimed is:

1. A thermal storage air conditioner comprising:
a thermal storage circuit configured to circulate a thermal medium and to which a thermal storage tank and at least one heat exchanger are connected, the thermal storage tank configured to accumulate the thermal storage medium;
a refrigerant circuit configured to circulate a refrigerant and to which an indoor heat exchanger is connected, the indoor heat exchanger being configured to cool a room through evaporation of the refrigerant; and
a controller configured to
receive a first signal requesting reduced power usage;
receive a second signal requesting accelerated power usage;
receive a third signal withdrawing a previously received request for reduced or accelerated power usage;
switch an operation by controlling the thermal storage circuit and the refrigerant circuit based on whether the received signal is the first signal, the second signal, or the third signal,
wherein the controller is further configured to implement
a utilization cooling operation in which the thermal storage medium absorbs heat from the refrigerant and in which the refrigerant evaporates in the indoor heat exchanger, when the controller receives the first signal during an operation in which the room is cooled by the refrigerant evaporating in the indoor heat exchanger,
a cooling and cold thermal energy storage operation in which the refrigerant absorbs heat from the thermal storage medium and in which the refrigerant evaporates in the indoor heat exchanger, when the controller receives the second signal during the operation in which the room is cooled by the indoor heat exchanger serving as an evaporator;
a simple cooling operation in which the refrigerant evaporates in the indoor heat exchanger and the thermal storage medium is not circulated, when the controller receives the third signal during performance of the utilization cooling operation or the cooling and cold thermal energy storage operation,
wherein the cooling and cold thermal energy storage operation consumes larger power than the simple cooling operation.

2. The thermal storage air conditioner of claim 1, wherein the thermal storage tank has a rated thermal storage capacity greater than a thermal storage capacity required to maintain the utilization cooling operation for a predetermined period of time at a rated cooling capacity.

3. The thermal storage air conditioner of claim 2, wherein the predetermined period of time is one hour.

4. A thermal storage air conditioner comprising:
a thermal storage circuit configured to circulate a thermal medium and to which a thermal storage tank and at least one heat exchanger are connected, the thermal storage tank configured to accumulate the thermal storage medium;
a refrigerant circuit configured to circulate a refrigerant and to which an indoor heat exchanger is connected, the indoor heat exchanger being configured to cool a room through evaporation of a refrigerant; and
a controller configured to
receive a first signal requesting reduced power usage;
receive a second signal requesting accelerated power usage;
switch an operation by controlling the thermal storage circuit and the refrigerant circuit based on whether the received signal is the first signal or the second signal,
wherein the controller is further configured to implement
a simple cooling operation in which the refrigerant evaporates in the indoor heat exchanger and the thermal storage medium is not circulated,
a utilization cooling operation in which the thermal storage medium absorbs heat from the refrigerant and in which the refrigerant evaporates in the indoor heat exchanger, when the controller receives the first signal during the simple cooling operation, and
a cooling and cold thermal energy storage operation in which the refrigerant absorbs heat from the thermal storage medium and in which the refrigerant evaporates in the indoor heat exchanger, when the controller receives the second signal during the simple cooling operation,
wherein the cooling and cold thermal energy storage operation consumes larger power than the simple cooling operation.

5. The thermal storage air conditioner of claim 4, wherein the thermal storage tank has a rated thermal storage capacity greater than a thermal storage capacity required to maintain the utilization cooling operation for a predetermined period of time at a rated cooling capacity.

6. The thermal storage air conditioner of claim 5, wherein the predetermined period of time is one hour.

7. A thermal storage air conditioner comprising:
a thermal storage circuit configured to circulate a thermal medium and to which a thermal storage tank and at least one heat exchanger are connected, the thermal storage tank being configured to accumulate the thermal storage medium;
a refrigerant circuit configured to circulate a refrigerant and to which an indoor heat exchanger is connected, the indoor heat exchanger being configured to cool a room through evaporation of the refrigerant; and
a controller configured to
receive a first signal requesting reduced power usage;
receive a second signal requesting accelerated power usage;
receive a third signal withdrawing a previously received request for reduced or accelerated power usage;
switch an operation by controlling the thermal storage circuit and the refrigerant circuit based on whether the received signal is the first signal, the second signal, or the third signal,
wherein the controller is further configured to implement
a utilization cooling operation in which the thermal storage medium absorbs heat from the refrigerant and in which the refrigerant evaporates in the indoor heat exchanger, when the controller receives the first signal during an operation in which the room is cooled by the refrigerant evaporating in the indoor heat exchanger, a cooling and cold thermal energy storage operation in which the refrigerant absorbs heat from the thermal storage medium and in which the refrigerant evaporates in the indoor heat exchanger, when the controller receives the second signal during the operation in which the room is cooled by the indoor heat exchanger serving as an evaporator;

a simple cooling operation in which the refrigerant evaporates in the indoor heat exchanger, and the refrigerant bypasses a first line that comprises the at least one heat exchangers configured for transfer of heat between the thermal storage medium and the refrigerant, when the controller receives the third signal during performance of the utilization cooling operation or the cooling and cold thermal energy storage operation, wherein the cooling and cold thermal energy storage operation consumes larger power than the simple cooling operation.

8. The thermal storage air conditioner of claim 7, wherein the thermal storage tank has a rated thermal storage capacity greater than a thermal storage capacity required to maintain the utilization cooling operation for a predetermined period of time at a rated cooling capacity.

9. The thermal storage air conditioner of claim 8, wherein the predetermined period of time is one hour.

10. A thermal storage air conditioner comprising:

a thermal storage circuit configured to circulate a thermal medium and to which a thermal storage tank and at least one heat exchanger are connected, the thermal storage tank being configured to accumulate the thermal storage medium;

a refrigerant circuit configured to circulate a refrigerant and to which an indoor heat exchanger is connected, the indoor heat exchanger configured to cool a room through evaporation of the refrigerant; and a controller configured to
receive a first signal requesting reduced power usage;
receive a second signal requesting accelerated power usage;
switch an operation by controlling the thermal storage circuit and the refrigerant circuit based on whether the received signal is the first signal or the second signal, wherein the controller is further configured to implement
a simple cooling operation in which the refrigerant evaporates in the indoor heat exchanger, and the refrigerant bypasses a first line that comprises the at least one heat exchangers configured for transfer of heat between the thermal storage medium and the refrigerant, a utilization cooling operation in which the thermal storage medium absorbs heat from the refrigerant and in which the refrigerant evaporates in the indoor heat exchanger, when the controller receives the first signal during the simple cooling operation, and a cooling and cold thermal energy storage operation in which the refrigerant absorbs heat from the thermal storage medium and in which the refrigerant evaporates in the indoor heat exchanger, when the controller receives the second signal during the simple cooling operation, wherein the cooling and cold thermal energy storage operation consumes larger power than the simple cooling operation.

11. The thermal storage air conditioner of claim 10, wherein the thermal storage tank has a rated thermal storage capacity greater than a thermal storage capacity required to maintain the utilization cooling operation for a predetermined period of time at a rated cooling capacity.

12. The thermal storage air conditioner of claim 11, wherein the predetermined period of time is one hour.

13. The thermal storage air conditioner of claim 1, wherein the at least one heat exchanger includes a refrigerant path and a thermal medium path different from the refrigerant path.

14. The thermal storage air conditioner of claim 4, wherein the at least one heat exchanger includes a refrigerant path and a thermal medium path different from the refrigerant path.

15. The thermal storage air conditioner of claim 7, wherein the at least one heat exchanger includes a refrigerant path and a thermal medium path different from the refrigerant path.

16. The thermal storage air conditioner of claim 10, wherein the at least one heat exchanger includes a refrigerant path and a thermal medium path different from the refrigerant path.

* * * * *